United States Patent Office 3,313,798
Patented Apr. 11, 1967

3,313,798
ARYLIMIDAZOLINE CONTAINING MONO AZO DYES
Johannes Dehnert and Guenter Hansen, both of Ludwigshafen (Rhine), Germany, assignors to Badische Anilin- & Soda-Fabrik Aktiengesellschaft, Ludwigshafen (Rhine), Germany
No Drawing. Filed Dec. 10, 1963, Ser. No. 329,380
Claims priority, application Germany, Dec. 15, 1962, B 69,987
6 Claims. (Cl. 260—157)

This invention relates to new azo dyes containing an arylimidazoline radical which are suitable as disperse dyes for fast-color dyeing, particularly of materials of linear polyesters, polyamides or cellulose acetate in yellow to orange shades.

Many yellow to orange disperse dyes have already been described in the patent literature. These dyes however have in some cases insufficient fastnesses. Since the requirements which have to be satisfied, especially as regards light fastness, thermal fastness and wash fastness, are becoming increasingly stringent, it is the object of the present invention to provide dyes which go readily on the said materials and which are distinguished by very good light, thermal and wash fastnesses.

We have found that dyes having the formula I:

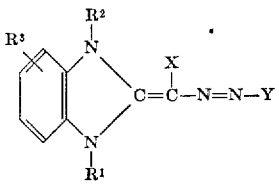

in which $R^1$ represents hydrogen, alkyl with one to four carbon atoms or phenyl, $R^2$ represents hydrogen or alkyl with one to four carbon atoms, $R^3$ represents hydrogen, methyl or methoxy, Y represents the radical of o-nitrophenyl unsubstituted or substituted by methyl, methoxy, chloro, acetylamino or diethylamino, and X represents cyano, carbamoyl or carboxy, satisfy the said conditions in an excellent way.

Dyes having the formula I in which the radical Y bears hydrogen, methoxy, chloro or methyl in p-position to the azo group, X represents carbamoyl and $R^1$, $R^2$ and $R^3$ represent hydrogen atoms are particularly valuable. Dyes having the formula I in which $R^1$ and $R^2$ represent methyl groups, $R^3$ represents a hydrogen atom and X represents a carbamoyl group are also distinguished by particularly good tinctorial properties, especially on polyester fibers.

The dyes of the invention are obtained when compounds having the formula:

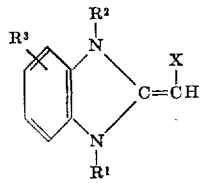

(in which $R^1$, $R^2$, $R^3$ and X have the meanings given above) are coupled with a diazotized o-nitraniline and the coupling products if desired are converted by alkylation into dyes of the formula I peralkylated on the arylimidazole ring. Salts having the formula:

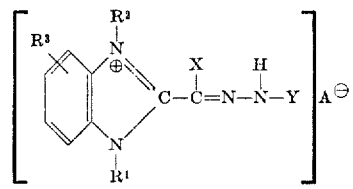

(in which $R^1$, $R^2$, $R^3$, X and Y have the meanings given above and $A^{\ominus}$ is an anion) are first formed by alkylation and these are converted in aqueous solution into compounds having the formula I.

Dyes having the formula I in which $R^2$ represents a hydrogen atom are in tautomeric equilibrium with the equivalent hydrazine forms and may be converted from one into the other:

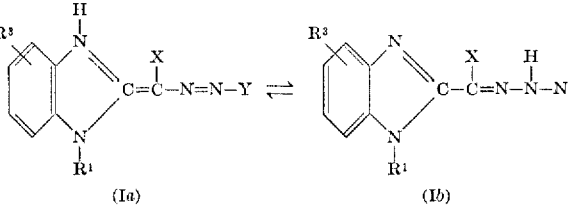

(Ia)　　　　　　　　(Ib)

$R^1$, $R^3$, X and Y have the meanings given above.

For the sake of simplicity, only formula Ia will be used in the following description.

Examples of diazotizable o-nitranilines for the production of the dyes having the formula I are:

1-amino-2-nitrobenzene,
1-amino-2-nitro-4-methylbenzene,
1-amino-2-nitro-4-methoxybenzene,
1-amino-2-nitro-4-chlorobenzene,
1-amino-2-nitro-4-acetylaminobenzene and
1-amino-2-nitro-4-dimethylaminobenzene.

Examples of coupling components are derivatives of naphthimidazole and preferably derivatives of benzimidazole. Specific coupling components are:

benzimidazolyl-2-acetamide,
1-methylbenzimidazolyl-2-acetamide,
1,3-dimethylbenzimidazolinylidene-2-acetamide,
benzimidazolyl-2-acetic acid,
1-methylbenzimidazolyl-2-acetic acid,
benzimidazolyl-2-acetophenylamide,
benzimidazoyl-2-acetic acid-β-chloroethylamide,
1-methylbenzimidazolyl-2-acetomethylamide,
benzimidazolyl-2-acetonitrile,
1-methylbenzimidazolyl-2-acetonitrile,
1-phenylbenzimidazolyl-2-acetonitrile,
5(6)-methylbenzimidazolyl-2-acetic and
5(6)-methoxybenzimidazolyl-2-acetamide.

Of the said compounds, benzimidazolyl-2-acetonitrile, benzimidazolyl-2-acetamide and benzimidazolyl-2-acetic acid are known from the literature. The remaining benzimidazolyl-2-acetonitriles are obtained by condensation of substituted 1,2-diaminobenzenes with isobutyl cyanate in the presence of acid catalysts; from these the corresponding benzimidazolyl-acetamides are obtained by partial hydrolysis by means of 96% sulfuric acid. Finally the methylene bases of these compounds are prepared by complete alkylation, for example with dimethyl sulfate.

Reaction of the diazo compounds with the coupling components to form the dyes having the formula I is advantageously carried out in aqueous medium and preferably at acid or neutral reaction. In some cases the reaction may be carried out in a mixture of water with organic solvents, for example glacial acetic acid or acetone. When the dyes contain alkylatable nitrogen atoms, they may be subsequently alkylated in organic solvents, such as chloroform, with an alkylating agent, such as dimethyl sulfate, if desired with the addition of acid-binding agents, such as magnesium oxide.

The new dyes are outstandingly suitable in solution or suspension for dyeing and printing textiles, for example mordanted cotton, leather or materials, such as fibers, flock, filaments, threads, films, sheets or spun goods of cellulose esters or ethers; the dyes according to the invention give dyeings and prints in pure and very fast shades particularly on materials of synthetic substances, such as polyamides, polyurethanes or polyesters.

The invention is further illustrated by the following examples. The parts and percentages specified in the examples are weight units unless otherwise specified. Parts by volume bear the same relation to parts by weight as the liter (S.T.P.) to the kilogram.

EXAMPLE 1

13.8 parts of 1-amino-2-nitrobenzene is dissolved in 26 parts of 96% sulfuric acid and 60 parts of water at 70° to 75° C. and the solution is allowed to flow with vigorous stirring into 70 parts of water and 240 parts of ice. 30 parts by volume of 23% sodium nitrite solution is added rapidly to the mixture obtained. The mixture is stirred for another hour at 0° to 5° C., filtered and the filtrate allowed to flow gradually into a mixture of 19.3 parts of benzimidazolyl-2-acetamide in 500 parts of water within fifteen minutes at 0° to 5° C. The excess sulfuric acid is then neutralized in the course of two hours with about 250 parts by volume of 50% sodium acetate solution. The reaction mixture is stirred for several hours at room temperature, the dye is filtered off, washed with water and dried. The dye obtained having the formula:

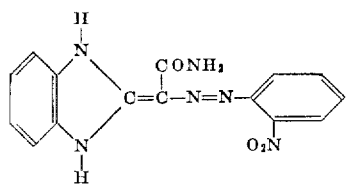

is a yellow powder which dissolves in dimethylformamide with a yellow color and dyes polyester, polyamide and acetate fibers full yellow shades having high fastness to light.

By using 15.2 parts of 1-amino-2-nitro-4-methylbenzene or 17.3 parts of 1-amino-2-nitro-4-chlorobenzene instead of 13.8 parts of 1-amino-2-nitrobenzene, dyes having similar properties are obtained.

By using 16.8 parts of 1-amino-2-nitro-4-methoxybenzene or 19.5 parts of 1-amino-2-nitro-4-acetylaminobenzene instead of 13.8 parts of 1-amino-2-nitrobenzene, dyes are obtained which dye polyester fibers light-fast reddish yellow to orange shades.

EXAMPLE 2

13.8 parts of 1-amino-2-nitrobenzene is diazotized as described in Example 1 and coupled at 0° to 5° C. with a suspension of 18 parts of benzimidazolyl-2-acetonitrile in 500 parts of water. The mixture is neutralized with 250 parts of 50% sodium acetate in the course of two hours, stirred for several hours and the dye suction filtered, washed with water and dried. A dye having the formula:

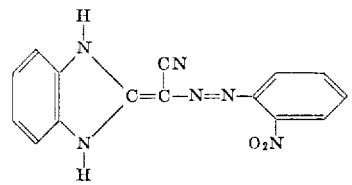

is obtained as a yellow powder which dissolves with a yellow color in dimethylformamide and dyes polyester fibers light-fast yellow shades.

EXAMPLE 3

13.8 parts of 1-amino-2-nitrobenzene is diazotized as described in Example 1 and the diazo solution is coupled with a suspension of 18.8 parts of 1-methylbenzimidazolyl-2-acetonitrile in 300 parts of water at 0° to 5° C. The mixture is neutralized with 250 parts of 50% sodium acetate solution and stirred for several hours. The dye is then filtered off and washed with water. The dried product having the formula:

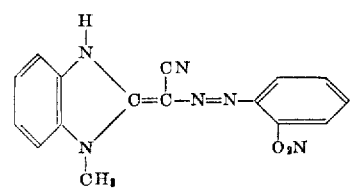

is yellow in color and dissolves with a yellow color in dimethylformamide. It dyes cellulose acetate fibers yellow shades having excellent light fastness.

EXAMPLE 4

17.5 parts of benzimidazolyl-2-acetamide is suspended in 50 parts of water, 5 parts of magnesium oxide is added and the mixture heated to 50° C. while stirring. While the mixture is at 50° C., 32 parts of dimethyl sulfate is allowed to flow in gradually, care being taken that the temperature of the mixture does not rise above 70° C. The whole is then stirred for another hour at 70° C. The cooled solution, which contains the methylene base having the formula:

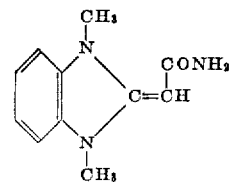

is diluted with 500 parts of water and allowed to flow into a diazo solution obtained as described in Example 1 at 0° to 5° C. The whole is neutralized with 250 parts of 50% sodium acetate solution and stirred for several hours. The deposited dye is suction filtered, washed with water and dried. A dye having the formula:

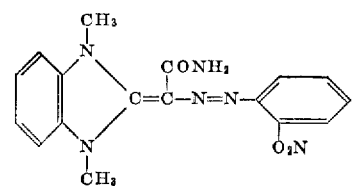

is obtained as a yellow powder which dissolves in hot water with a yellow color and dyes polyacrylonitrile fibers in very light-fast yellow shades. Yellow dyeings having good to very good light fastness are also obtained on polyester, polyamide and acetate cloth.

By using 16.8 parts of 1-amino-2-nitro-4-methoxybenzene, 19.5 parts of 1-amino-2-nitro-4-acetylaminobenzene, 17.3 parts of 1-amino-4-chloro-2-nitrobenzene or 15.2 parts of 1-amino-2-nitro-4-methylbenzene instead of 13.8 parts of 1-amino-2-nitrobenzene, dyes having similar tinctorial properties are obtained.

The methylene base used as intermediate may also be prepared as follows:

92.5 parts of 1,3-dimethyl-2-cyanomethylenebenzimidazoline is stirred into 250 parts of 96% sulfuric acid, the temperature not being allowed to rise above 25° C. The whole is stirred for another two hours, the mixture split up on 1000 parts of ice and neutralized with caustic soda solution while cooling. The deposited methylene base is suction filtered and recrystallized from ethanol. 1,3-dimethyl-2-carboxylicamidomethylenebenzimidazoline having a melting point of 212° C. is obtained.

EXAMPLE 5

30 parts by volume of 23% sodium nitrite solution is added to a mixture of 17.3 parts of 1-amino-4-chloro-2-nitrobenzene, 100 parts of water and 100 parts of ice and then while stirring 30 parts by volume of 30% hydrochloric acid is added all at once. The whole is stirred for another ten minutes at 0° to 5° C. and the solution filtered.

20.8 parts of 1-methylbenzimidazolyl-2-acetamide is dissolved in 500 parts of water. The diazonium solution prepared according to the preceding paragraph is allowed to flow gradually into the same within fifteen minutes at 0° to 5° C. and the excess of acid is neutralized with about 75 parts of 50% sodium acetate solution in the course of two hours. The whole is stirred for several hours and then the dye is suction filtered, washed with water and dried. A dye having the formula:

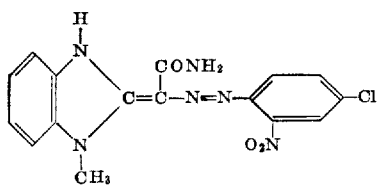

is obtained as a yellow powder which dissolves in dimethylformamide with a yellow color and dyes polyester fibers very light-fast yellow shades.

If 13.8 parts of 1-amino-2-nitrobenzene or 15.2 parts of 1-amino-2- nitro-4-methylbenzene is used instead of 17.3 parts of 1-amino-4-chloro-2-nitrobenzene, dyes having similar properties are obtained.

EXAMPLE 6

13.8 parts of 1-amino-2-nitrobenzene is diazotized as described in Example 1 and coupled with a suspension of 19.4 parts of benzimidazolyl-2-acetic acid in 500 parts of water at 0° to 5° C. The excess of acid is neutralized in the course of two hours with about 250 parts by volume of 50% sodium acetate solution, the whole stirred for several hours and the dye then suction filtered, washed with water and dried. A dye having the formula:

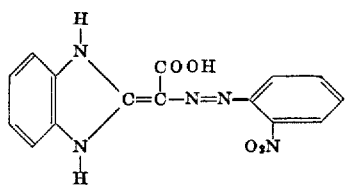

is obtained as a yellow powder which dissolves in dimethylformamide with a yellow color and dyes polyamide fibers in outstandingly fast yellow shades.

We claim:
1. A dye of the formula:

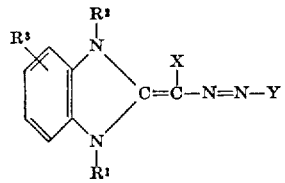

wherein $R^1$ represents a member selected from the class consisting of hydrogen, alkyl with 1 to 4 carbon atoms and phenyl, $R^2$ represents a member selected from the class consisting of hydrogen and alkyl with 1 to 4 carbon atoms, $R^3$ represents a member selected from the class consisting of hydrogen, methyl and methoxy, Y represents the radical of o-nitrophenyl, substituted by a member selected from the class consisting of hydrogen, methyl, methoxy, chloro, acetylamino and diethylamino, and X represents a member selected from the class consisting of cyano, carbamoyl and carboxy.

2. A dye selected from the class consisting of the formula:

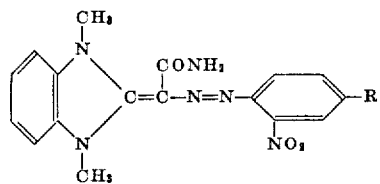

and

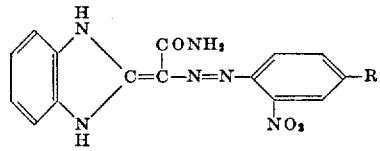

wherein

R represents a member selected from the class consisting of hydrogen, methyl, methoxy and chloro.

3. The dye of the formula:

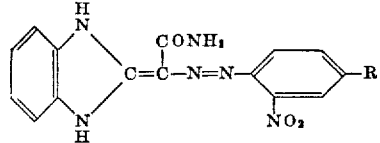

4. The dye of the formula:
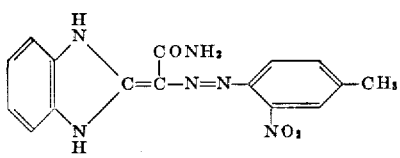
5. The dye of the formula:
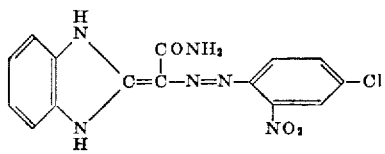
6. The dye of the formula:
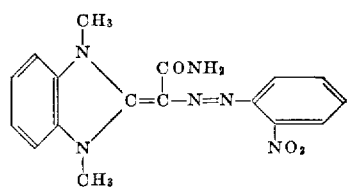
No references cited.
CHARLES B. PARKER, *Primary Examiner.*
D. M. PAPUGA, *Assistant Examiner.*